(12) United States Patent
Tachiki

(10) Patent No.: US 8,503,877 B2
(45) Date of Patent: Aug. 6, 2013

(54) IMAGING DEVICE HOUSING

(75) Inventor: Koji Tachiki, Osaka (JP)

(73) Assignee: Panasonic Corporation, Osaka (JP)

( * ) Notice: Subject to any disclaimer, the term of this patent is extended or adjusted under 35 U.S.C. 154(b) by 274 days.

(21) Appl. No.: 12/716,550

(22) Filed: Mar. 3, 2010

(65) Prior Publication Data

US 2010/0226643 A1 Sep. 9, 2010

(30) Foreign Application Priority Data

Mar. 4, 2009 (JP) ................................ 2009-050649

(51) Int. Cl.
*G03B 17/02* (2006.01)

(52) U.S. Cl.
USPC ......................................................... 396/535

(58) Field of Classification Search
USPC ......................................................... 396/535
See application file for complete search history.

(56) References Cited

U.S. PATENT DOCUMENTS

| | | | | |
|---|---|---|---|---|
| 2003/0081399 A1* | 5/2003 | Davis et al. | ................... | 361/818 |
| 2003/0202319 A1* | 10/2003 | Chen | ................... | 361/683 |
| 2004/0047121 A1* | 3/2004 | Hope | ................... | 361/683 |
| 2004/0150958 A1* | 8/2004 | Calhoon | ................... | 361/725 |
| 2005/0013105 A1* | 1/2005 | Lin et al. | ................... | 361/683 |
| 2008/0247750 A1* | 10/2008 | Law et al. | ................... | 396/535 |
| 2009/0034962 A1* | 2/2009 | Mitani | ................... | 396/535 |
| 2009/0086417 A1* | 4/2009 | Hasegawa | ................... | 361/679.01 |
| 2009/0284109 A1* | 11/2009 | Lee | ................... | 312/223.2 |

FOREIGN PATENT DOCUMENTS

| | | |
|---|---|---|
| JP | 5-75904 | 3/1993 |
| JP | 6-78191 | 3/1994 |
| JP | 10-335849 | 12/1998 |
| JP | 2006-295757 | 10/2006 |

\* cited by examiner

*Primary Examiner* — Clayton E Laballe
*Assistant Examiner* — Dennis Hancock
(74) *Attorney, Agent, or Firm* — Wenderoth, Lind & Ponack, L.L.P.

(57) ABSTRACT

A main body component of a video camera includes a main frame. The main frame has a upper wall and a lower wall. The upper wall has an upper wall main body disposed opposite the lower wall, and projections that protrude from the upper wall main body on the opposite side from the lower wall. The rear wall is molded integrally with the upper wall and the lower wall, and links the upper wall and the lower wall.

17 Claims, 11 Drawing Sheets

IMAGING DEVICE HOUSING

CROSS-REFERENCE TO RELATED APPLICATIONS

This application claims priority to Japanese Patent Application No. 2009-050649 filed on May 4, 2009. The entire disclosure of Japanese Patent Application No. 2009-050649 is hereby incorporated herein by reference.

BACKGROUND

1. Technical Field

The technology disclosed in the present application relates to an imaging device housing.

2. Description of the Related Art

Imaging device housings comprising a plurality of metal panels have been proposed in the past. For example, Patent Document 1 (Japanese Laid-Open Patent Application H6-78191) discusses a video camera comprising an upper case and lower case formed by bending PVC steel sheets obtained by covering the outer surface of sheet steel with PVC, a chassis formed by bending sheet steel, and so forth.

However, since the various parts in Patent Document 1 are formed by bending sheet steel, it is difficult to make the housing strong enough. Adequate housing strength can be ensured by increasing the thickness of the parts, but this does not increase strength very efficiently, and ends up increasing the overall weight of the housing more than necessary. Increasing sheet thickness is therefore not a practical solution.

In view of these concerns over strength and weight, a manufacturing method has been employed in recent years in which the various parts of a housing are formed by casting. With casting, ribs can be provided where necessary for added strength, and this allows the required strength to be ensured.

However, because casting entails the use of a mold, removal from the mold has to be taken into account, and this increases the number of parts. More parts means more assembly steps, so this drives up the manufacturing cost.

BRIEF SUMMARY OF THE INVENTION

The imaging device housing according to a first aspect of the present invention includes a first plate, a second plate, and a third plate. The second plate has a second plate main body and a first protrusion. The second plate main body is disposed to be opposite the first plate in a first direction. The first protrusion protrudes from a first end of the second plate main body to the opposite side from the first plate, and extends along the first end. The third plate is formed integrally with the first plate and the second plate, and links the first plate to the second plate.

The first protrusion increases the cross sectional coefficient of the second plate, which makes it easier to ensure adequate strength of the second plate. In other words, providing the first protrusion affords higher strength.

Furthermore, providing the first protrusion eliminates the need to provide the second plate with numerous portions that protrude to the first plate side in order to ensure adequate second plate strength, and this simplifies the shape of the second plate on the first plate side. Consequently, when the first plate, second plate, and third plate are integrally molded, the mold allows removal from the space between the first plate and the second plate, allowing the integral molding of the first plate, second plate, and third plate. In other words, with this housing, assembly entails fewer steps, and the manufacturing cost can be reduced.

Furthermore, the second plate main body, the second plate, and the third plate do not need to be members that are completely plate-shaped, and projections or holes may be provided, for example, to the extend that integral molding is not hampered.

BRIEF DESCRIPTION OF DRAWINGS

Referring now to the attached drawings, which form a part of this original disclosure.

DETAILED DESCRIPTION OF THE INVENTION

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

(1) First Embodiment

A first embodiment will be described through reference to the drawings.

(1-1) Overall Structure of Video Camera

Figure 1:
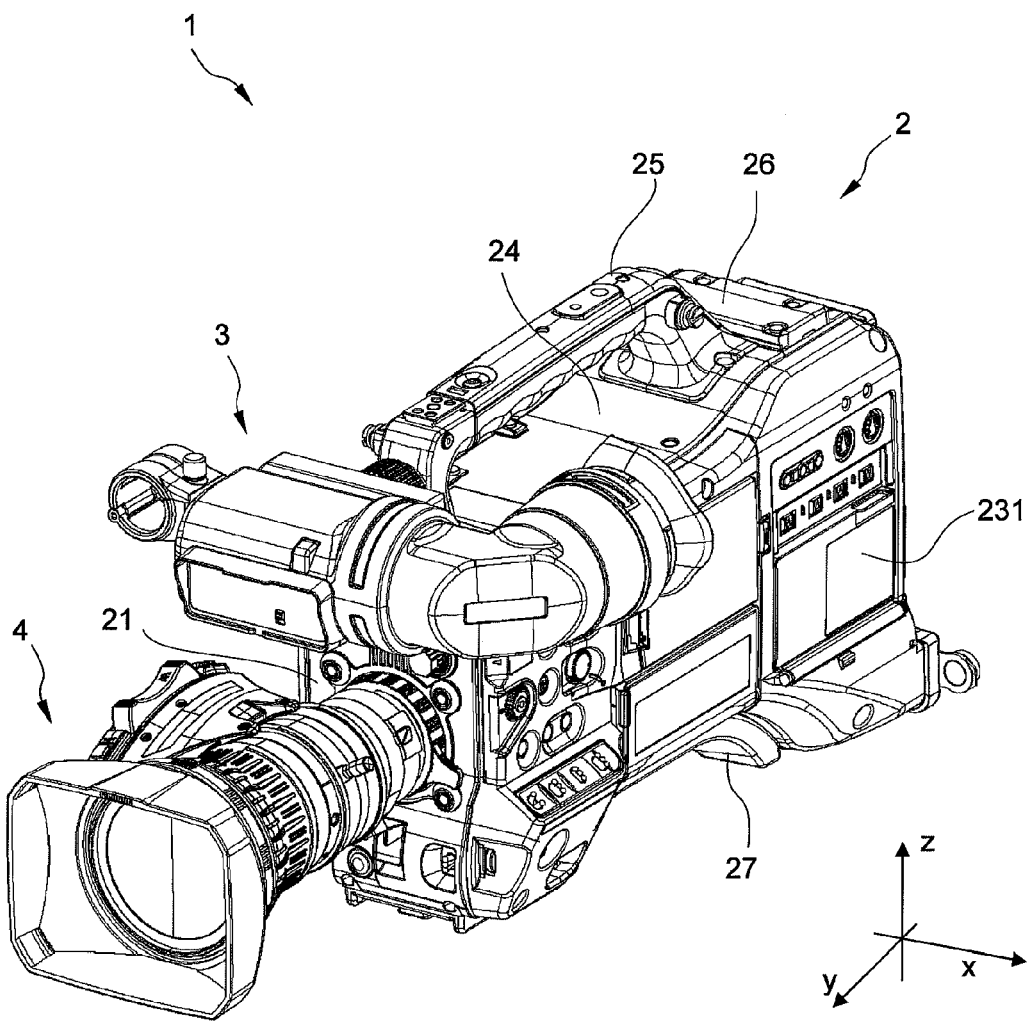
FIG. 1 is an oblique view of the front, left, and top faces of the video camera 1 in an embodiment.
Figure 2:
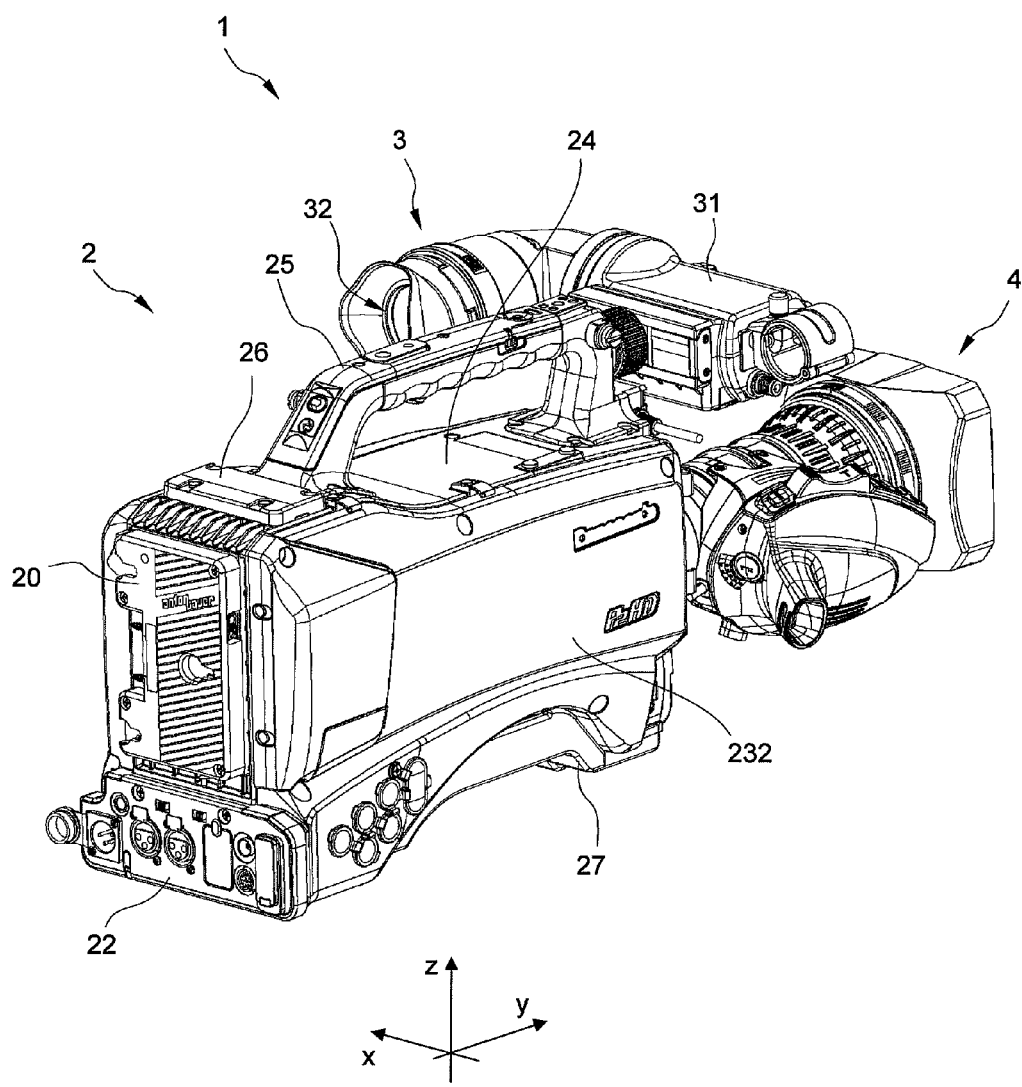
FIG. 2 is an oblique view of the rear, bottom, and right faces of the video camera 1.

FIGS. 1 and 2 are oblique views of the outside of a video camera 1 in this embodiment. FIG. 1 shows the front, left, and top faces of the video camera 1, while FIG. 2 shows the rear, bottom, and right faces of the video camera 1.

In this Specification, terms indicating direction, such as "front," "back," "up," "down," "right," and "left," indicate directions as seen by the user, that is, a person looking through a viewfinder component 3, during normal use of the video camera 1. In the drawings, the lateral (left and right) direction is indicated by arrows as the x axis direction, the front and back direction as the y axis direction, and the up and down direction as the z axis direction.

As shown in FIGS. 1 and 2, the video camera (imaging device) 1 includes a main body component (housing) 2, the viewfinder component 3, and a lens component 4.

As shown in FIGS. 1 and 2, the main body component 2 has an overall shape that is cuboid. The main body component 2 includes a main frame 20; a front panel 21 that is disposed at the front face of the main frame 20; a jack panel 22 that is disposed at the lower rear of the main frame 20; a left side panel 231 (first panel member) that is disposed on the left side of the main frame 20; a right side panel 232 (second panel member) that is disposed on the right side of the main frame 20; a top cover (cover member) 24, a handle 25, and a receiver cover 26 that are disposed at the top face of the main frame 20; a bottom panel 27 that is disposed at the bottom face of the main frame 20; and so on. The structure of the main body component 2 will be described in detail through reference to FIG. 3, etc.

As shown in FIGS. 1 and 2, the viewfinder component 3 includes a barrel 31 and a viewfinder 32 provided to one end of the barrel 31. The viewfinder component 3 is fixed to the front face of the handle 25 so the viewfinder 32 is disposed on the left side of the main body component 2. Because the viewfinder component 3 is fixed so that its relative position in the x axis direction can be changed with respect to the handle 25, the viewfinder 32 can be positioned to match the position of the user's eye.

As shown in FIGS. 1 and 2, the lens component 4 is a cylindrical member equipped with a filter, a lens, etc., and is removably fixed to the front panel 21. The user can replace the lens component 4 to suit the imaging subject, imaging conditions, etc.

When using the video camera 1, the user grips the handle 25 and lifts the video camera 1. The user then places the video camera 1 on his shoulder to that the bottom panel 27 rests on the shoulder, and captures an image while looking through the viewfinder 32.

The video camera 1 further includes various other members that are used in imaging and not shown in the drawings, such as lenses and other optical members, imaging elements, and control devices (CPU (Central Processing Unit), RAM (Random Access Memory), ROM (Read Only Memory), etc.).

(1-2) Structure of Main Body Component 2

The constitution of the main body component 2 will be described in detail through reference to FIGS. 3 to 9.

Figure 3:
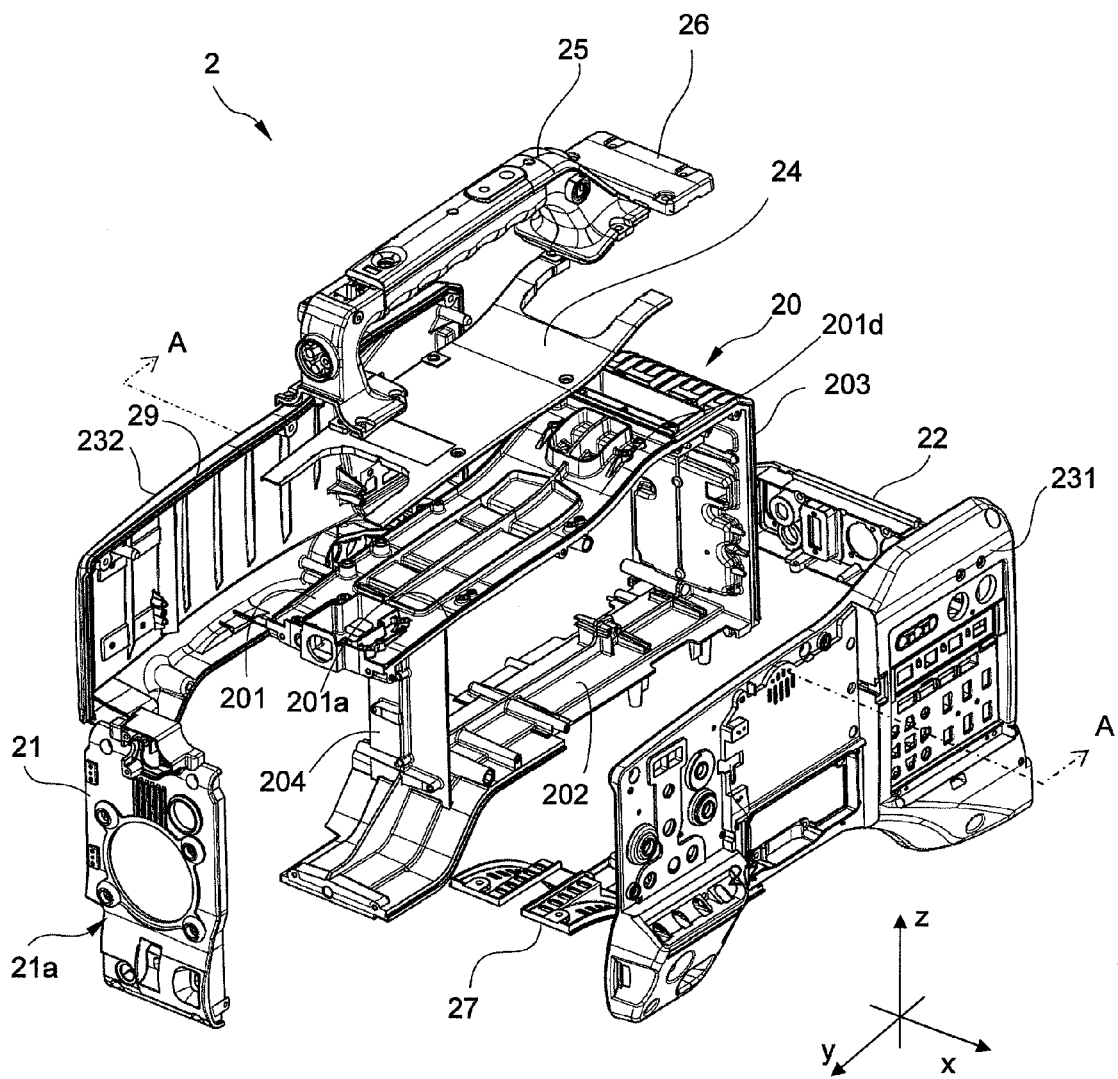
FIG. 3 is an exploded oblique view showing the structure of the main body component 2.
Figure 4:
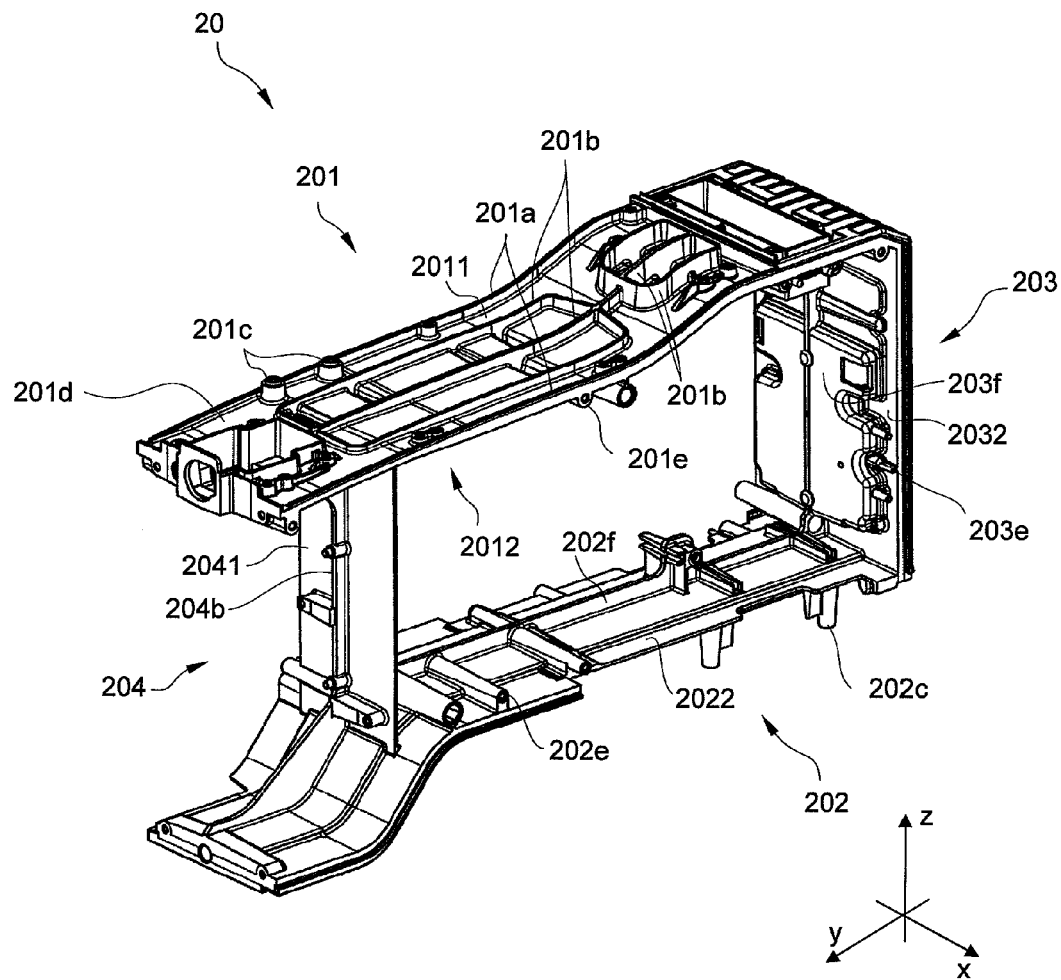
FIG. 4 is an oblique view of the main frame 20 as seen from above and to the front.
Figure 6:
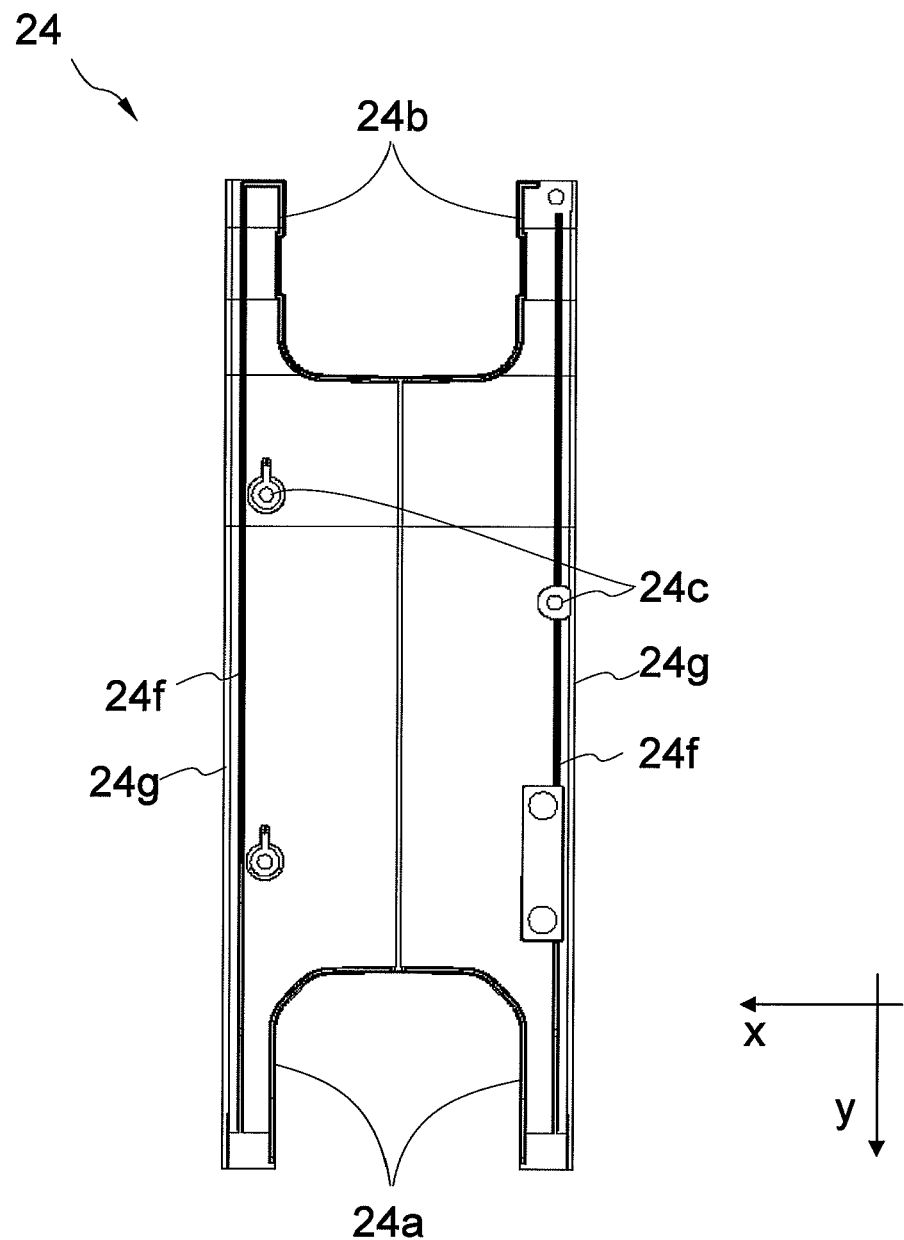
FIG. 6 is a bottom view of the top cover 24.
Figure 7:
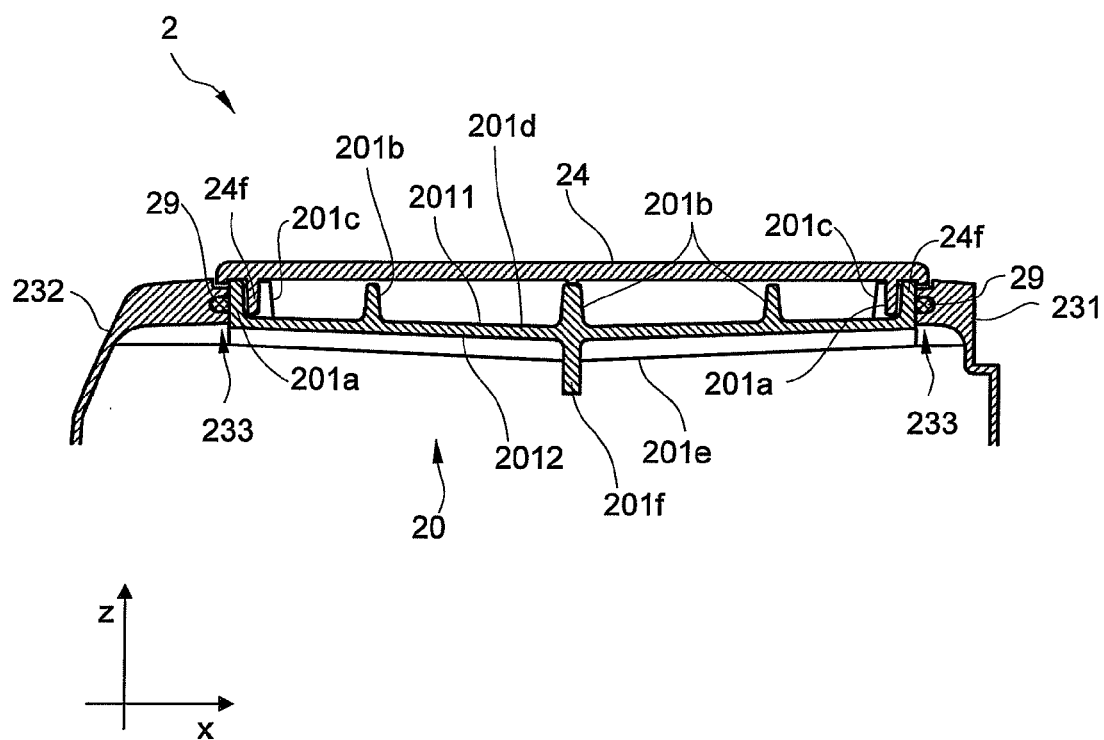
FIG. 7 is a cross section of part of the main body component 2 along the A-A line.
Figure 8:
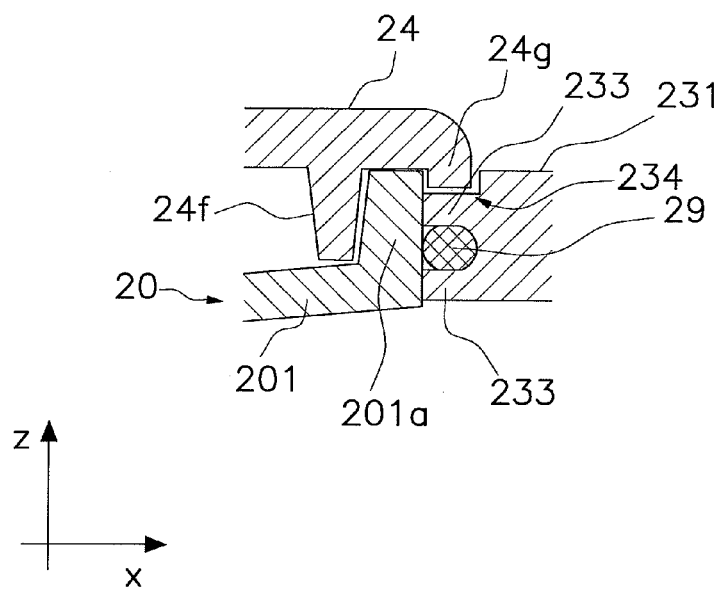
FIG. 8 is a detail enlargement of part of FIG. 7.

FIG. 3 is an exploded oblique view showing the structure of the main body component 2. FIG. 4 is an oblique view of the main frame 20 as seen from above and to the front, and FIG. 5 of the main frame 20 as seen from below and to the rear. FIG. 6 is a bottom view of the top cover 24. FIG. 7 is a cross section of part of the main body component 2 along the A-A line. FIG. 8 is a detail enlargement of part of FIG. 7. Only the left side panel 231 is shown in FIG. 8, but the right side panel 232 has the same constitution.

As shown in FIG. 3, the main frame 20 includes four walls: an upper wall (second plate) 201, a lower wall (first plate) 202, a rear wall (third or fourth plate) 203, and a front wall 204 (third or fourth plate). These four walls are disposed so that the upper wall 201 and the lower wall 202 face each other in the z axis direction (first direction), and so that the rear wall 203 and the front wall 204 face each other in the y axis direction. In other words, the four walls 201 to 204 are disposed so as to form a substantially rectangular shape overall, with one side of each facing inward. The rear wall 203 and the front wall 204 link the upper wall 201 and the lower wall 202.

Figure 5:
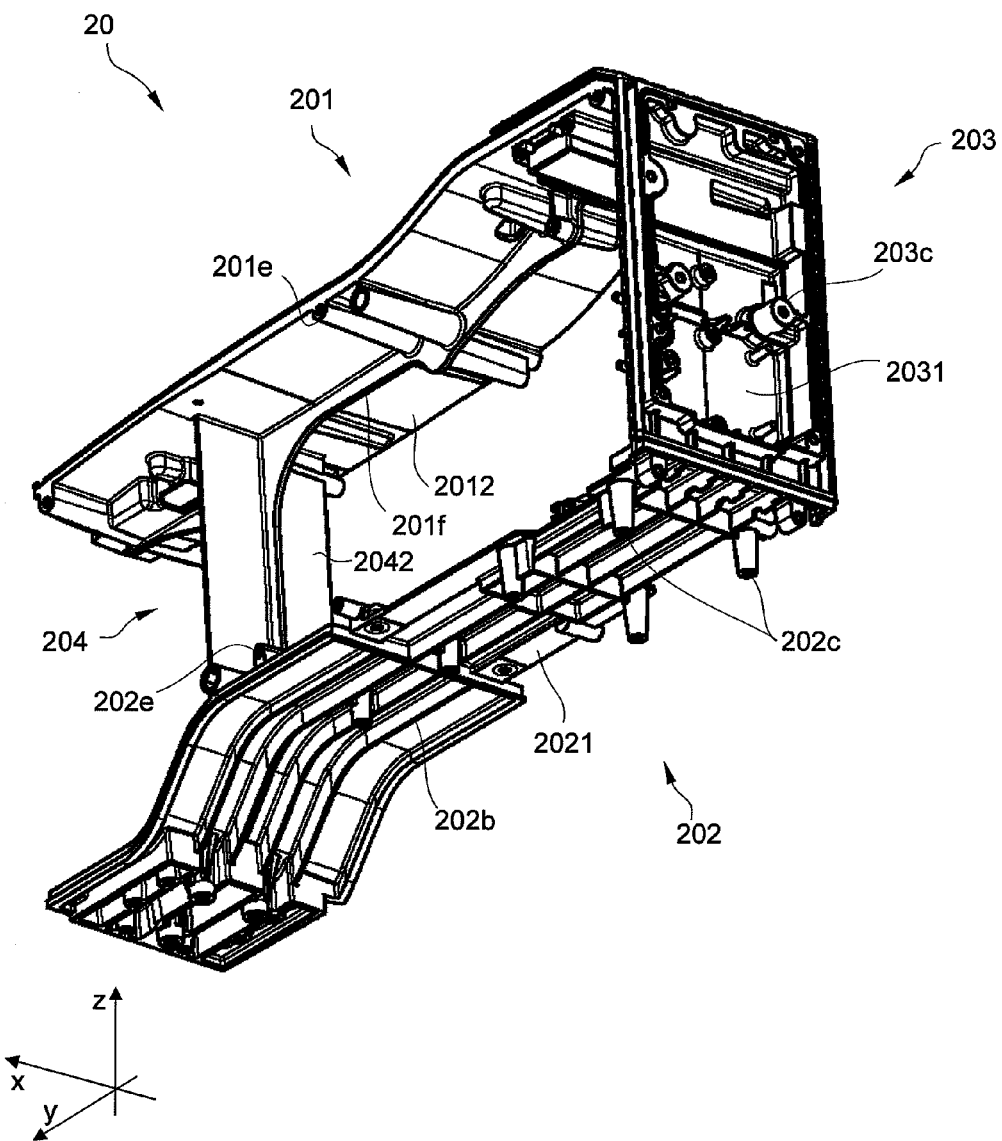
FIG. 5 is an oblique view of the main frame 20 as seen from below and to the rear.

As shown in FIGS. 4 and 5, of the two sides of the upper wall 201, the lower wall 202, the rear wall 203, and the front wall 204, the sides that face the outside of the rectangular shape of the main frame 20 are considered the outer face and are numbered 2011, 2021, 2031, and 2041, respectively, while the sides that face the inside are considered the inner faces and are numbered 2012, 2022, 2032, and 2042, respectively. The outer face 2011 corresponds to the upper face of the upper wall 201, the inner face 2012 to the lower face of the upper wall 201, the outer face 2021 to the lower face of the lower wall 202, the inner face 2022 to the upper face of the lower wall 202, the outer face 2031 to the rear face of the rear wall 203, the inner face 2032 to the front face of the rear wall 203, the outer face 2041 to the front face of the front wall 204, and the inner face 2042 to the rear face of the front wall 204.

The front ends of the upper wall 201 and the lower wall 202 stick out forward beyond the front wall 204, and the region of the lower face of the upper wall 201 that is farther forward than the front wall 204, and the region of the upper face of the lower wall 202 that is farther forward than the front wall 204, are also called the inner faces 2012 and 2022, respectively.

The entire main frame 20 is formed integrally. There are no particular restrictions on the material of the main frame 20, but magnesium alloys, aluminum alloys, and other such metals can be used to advantage, for example. Also, as will be discussed below, the main frame 20 includes portions of different thicknesses (such as bosses or ribs). Therefore, casting, and particularly die-casting, can be used to advantage as the manufacturing method.

The main frame 20 in this embodiment can be formed with five casting molds that allows removal in five directions: up, down, backward, left, and right. To make this manufacturing method possible, the inner faces 2012, 2022, 2032, and 2042 and the outer face 2041 of the front wall 204 are formed in a shape such that the molds allow removal to the left and right (in the x axis direction). More specifically, the inner face 2012 of the upper wall and the inner face 2022 of the lower wall are formed so that no depressions are formed in a cross section parallel to the z-x plane. Also, the inner face 2032 of the rear wall and the two faces 2041 and 2042 of the front wall are formed so that no depressions are formed in a cross section parallel to the x-y plane. The word "depressions" here refers to a structure having two faces (including curve faces) that are opposite each other in the x axis direction. That is, two projections that are non-continuous in the x axis direction can also be called a depression.

On the other hand, depressions in a cross section parallel to the z-x plane or parallel to the x-y plane may be formed in the outer faces 2011, 2021, and 2031 of the three walls 201 to 203. Accordingly, a variety of shapes can be employed for these outer faces, such as a shape in which two or more screw holes that are recessed from the outer face toward the inner face side, or bosses, ribs, or other such projections are aligned in the x axis direction, or ribs with a closed shape (rectangular, lattice-shaped, etc.). Examples of the shapes of the outer faces and the inner faces are described below.

Shapes such as these allow the main frame 20 to be integrally molded by a variety of casting methods, such as die-casting. Integral molding such as this reduces the number of parts required, shortens the manufacturing process, and cuts down on the manufacturing cost.

Since the outer face 2011 of the upper wall 201 can be formed in a mold that allows removal upward, a depression may be formed in the z-x plane. Accordingly, in the outer face 2011, a pair of projections 201a (first protrusions), a plurality of ribs (such as ribs 201b), a plurality of bosses (such as bosses 201c), or the like are formed (FIG. 4).

As shown in FIGS. 4 and 7, the projections 201a are an example of first protrusion and second protrusions that touch the side panels 231 and 232. The projections 201a are formed linked along both edges (edges extending in the y axis direction) in the x axis direction of the top cover 24, and have a shape in which they protrude upward (the opposite side from the lower wall 202) from an upper wall main body 201d (second plate main body). The upper wall main body 201d is disposed so as to be opposite the lower wall 202 in the y axis direction.

As discussed above, bosses, ribs, or other such projections are formed in addition to the projections 201a on the outer face 2011. As a result, as shown in FIG. 7, a plurality of projections are formed that are aligned in the x axis direction. In other words, depressions in a cross section parallel to the x-z plane are formed on the outer face 2011. Also, screw holes, into which screws are inserted in the vertical direction, are provided to bosses (such as the bosses 201c) on the outer face 2011, and these also correspond to depressions in a cross section parallel to the x-z plane. The top cover 24, the handle 25, the receiver cover 26, and other such members are fixed to the main frame 20 by fitting screws into these screw holes and into screw holes provided to these members (24, 25, 26).

Meanwhile, as shown in FIGS. 5 and 7, a rib 201f extending in the y axis direction is formed in the approximate center in the x axis direction of the inner face 2012 of the upper wall 201. A plurality of bosses (such as 201e) used for linking the side panels 231 and 232 and other such members are also formed on the inner face 2012. These bosses have a shape that extends in the x axis direction along the entire surface of the inner face 2012, and the screw holes are shaped to allow screws to be inserted in the x axis direction.

The outer face 2021 of the lower wall 202 can be formed in a casting mold that allows removal downward. Accordingly, the outer face 2021 of the lower wall 202 is similar to the outer face 2011 of the upper wall in that it may include a plurality of ribs (such as ribs 202b), a plurality of bosses (such as bosses 202c) having screw holes extending in the z axis direction, or the like, and these structures may be disposed so that they are aligned in the x axis direction (FIG. 5). The bosses or screw holes provided to the lower wall 202 are used to fix the bottom panel 27 to the main frame 20 (FIG. 3).

The inner face 2022 of the lower wall 202 is similar to the inner face 2012 of the upper wall in that a rib 202f extending in the y axis direction is formed in the approximate center in the x axis direction. A plurality of bosses (such as 202e) used for linking the side panels 231 and 232 and other such members are also formed on the inner face 2022, but these bosses have a shape that extends in the x axis direction along the entire surface of the inner face 2012, and the screw holes in these bosses are shaped to allow screws to be inserted in the x axis direction.

The outer face 2031 of the rear wall 203 can be formed in a casting mold that allows removal rearward. Accordingly, the outer face 2031 of the rear wall 203 may include a plurality of bosses (such as bosses 203c) having screw holes extending in the y axis direction, or other projections or the like, and these may be disposed so that they are aligned in the x axis direction (FIG. 5).

The inner face 2032 of the rear wall 203 includes a protrusion structure 203f, a boss 203e, or the like (FIG. 4). As mentioned above, the inner face 2032 of the rear wall 203 is formed in a casting mold that allows removal to the left and right, so it has a structure formed continuously up to the inner face of another wall, such as a boss 203g formed at the corner between the inner face 2032 of the rear wall 203 and the inner face 2022 of the lower wall 202 (FIG. 4). The profile of the edge in the z axis direction of the projection on the inner face 2032 of the rear wall 203 is parallel to the x axis direction.

A rib 204b parallel to the z axis direction is formed in the approximate center of the outer face 2041 in the x axis direction (FIG. 4). The rib 201f that is continuous from the inner face 2012 of the upper wall is formed on the inner face 2042 (FIG. 5).

Next, the front panel 21 and other members that constitute the main body component 2 will be described.

As shown in FIG. 3, the front panel 21 includes a lens attachment component 21a. Screw holes or the like are provided in the front panel 21 for fixing the front panel 21 to the front ends of the upper wall 201 and the lower wall 202.

Also, as shown in FIGS. 2 and 3, the jack panel 22 has a port for a cable that links the video camera 1 with an external device. The jack panel 22 also has screw holes, etc., for fixing the jack panel 22 to the lower part of the rear wall 203.

Also, as shown in FIG. 3, the side panels 231 and 232 are flat members equipped with screw holes, etc. The side panels 231 and 232 are similar to the main frame 20 in that they are formed from a magnesium alloy, aluminum alloy, or other such metal. There are no particular restrictions on how the side panels 231 and 232 are formed, but die-casting can be used just as with the main frame 20. The side panels 231 and 232 are fixed so as to cover the left and right sides of the main frame 20 by screwing together the screw holes in the side panels 231 and 232 and the screw holes provided extending in the x axis direction to the main frame 20, such as to the bosses 201e, 202e, and 203e provided to the inner face 2012 of the upper wall, the inner face 2022 of the lower wall, and the inner face 2032 of the rear wall.

Various synthetic resins can be used as the material that makes up the top cover 24, and more specifically a resin mixture of a polycarbonate and an ABS resin can be used to advantage. As shown in FIGS. 3 and 6, the top cover 24 is a substantially H-shaped flat member having protrusions 24a and 24b that extend in the front and back direction from the front and rear ends, respectively. The upper face of the top cover 24 (the face on the opposite side from the one facing the main frame 20) has a substantially flat shape. A plurality of screw holes (such as the screw holes 24c) used for fixing to the main frame 20 are provided in the top cover 24. The top cover 24 is fixed to the main frame 20 by passing screws through the screw holes in the top cover 24 and the bosses 201c provided to the outer face 2011 of the upper wall of the main frame 20, for example.

The top cover 24 covers the ribs or the like on the outer face 2011 of the upper wall 201, which gives the video camera 1 a smoother outer shape. In other words, providing the top cover 24 allows ribs to be provided on the outer face 2011 of the upper wall 201, so the video camera 1 can be made lighter, with less material being used. Also, since ribs can be provided to the outer face 2011 of the upper wall 201, adequate strength can be ensured in the main frame 20 even if there are fewer reinforcing ribs on the lower wall 202 side of the upper wall 201.

Also, covering a wide area of the outer face 2011 with the top cover 24 means that less surface area needs to be painted, which simplifies the video camera 1 manufacturing process.

As shown in FIGS. 6 to 8, the edges of the top cover 24 (and particularly the edges in the x axis direction) have a shape that protrudes downward (toward the main frame 20), as shown by the projections 24g in the drawings. Also, projections 24f that protrude downward are formed on the lower face of the top cover 24 (the opposite side from the main frame 20), and these projections 24f are formed so as to be continuous along the projections 24g, that is, along the edges of the top cover 24. In other words, on the lower face of the top cover 24, grooves extending along the edges of the top cover 24 are formed near the edges.

The handle 25 is fixed with screws to the outer face 2011 of the upper wall of the main frame 20. The handle 25 is a substantially U-shaped member, and its ends are fixed so as to touch the main frame 20 between the protruding portion 24a and the protruding portion 24b of the top cover 24, respectively.

As shown in FIG. 3, the receiver cover 26 has screw holes, and is fixed with screws to the outer face 2011 of the upper wall of the main frame 20 to the rear of the handle 25.

The bottom panel 27 is a flat member that curves upward. The bottom panel 27 is fixed to the lower face of the main frame 20 by passing screws through screw holes in the bottom panel 27 and screw holes in the bosses 202c provided to the outer face 2021 of the main frame 20.

Next, the portions where the main frame 20, the top cover 24, and the side panels 231 and 232 are joined will be described.

As shown in FIG. 7, the projections 201a of the upper wall 201 of the main frame 20 are in contact with the side panels 231 and 232 in a state in which the side panels 231 and 232 are fixed to the main frame 20. More specifically, as shown in FIGS. 7 and 8, two projections 233 that protrude toward the upper wall 201 are formed on the edges of the side panels 231 and 232. The two projections 233 are formed aligned in parallel with each other in the z axis direction and so as to be continuous with the edges of the side panels 231 and 232. The projections 201a of the main frame 20 are formed along the projections 233 so as to touch both of the projections 233 of the side panels.

As shown in FIG. 8, a shield gasket 29 (seal member) is provided between the two projections 233. The shield gasket 29 is supported sandwiched between the projections 201a and the two projections 233 of the side panels. Because the main frame 20 and the side panels 231 and 232 are linked via the shield gasket 29, a space is formed that is surrounded by metal inside the video camera 1. As a result, the video camera 1 can be protected against EMI (electromagnetic interference) produced by electromagnetic waves outside of the video camera 1, and external devices can be protected against EMI generated by electromagnetic waves inside the video camera 1.

When the main frame 20 and the side panels 231 and 232 are thus disposed with the shield gasket 29 in between, the edge of the main frame 20, in other words, a contact surface of the main frame 20 with the side panels 231 and 232, is preferably large enough to support the shield gasket 29 between the main frame 20 and the side panels 231 and 232. With the constitution of this embodiment, forming the projections 201a ensures enough surface area to support the shield gasket 29, and reduces the overall thickness of the main frame 20. Also, since the projections 201a are provided to the outer face 2011 of the upper wall 201, and not to the inner face 2012, a casting mold that allows removal in the lateral direction (the x axis direction) can be used in the manufacturing process. So the main frame 20 can be molded integrally.

Also, as shown in FIG. 8, the projections 201a of the main frame are designed to fit between projections 24f and 24g of the top cover. The advantage to this is that the position of the top cover 24 is less likely to shift with respect to the main frame 20.

Also, as shown in FIG. 8, the edges of the outer faces of the side panels 231 and 232 have a stepped structure 234 that is recessed from the surrounding part. The projection 24g of the top cover is designed to mate with this stepped structure 234. That is, the width of the top cover 24 in the x axis direction is set greater than the width of the upper wall 201 of the main frame 20, and the joined portions of the upper wall 201 and the side panels 231 and 232 are covered by the top cover 24. The advantage to this is that the joined portions of the upper wall 201 and the side panels 231 and 232 are protected.

The constitution of the junction of the upper wall 201 and the side panels 231 and 232 can also be applied to the joined portions between another wall of the main frame 20 and the side panels 231 and 232. That is, other walls also may include projections that stick out and correspond to the projections 201a, and may support a shield gasket at the joined portions with the side panels 231 and 232.

(2) Second Embodiment

The provision of a groove in which the above-mentioned shield gasket 29 is disposed is not limited to the side panels 231 and 232, and may also be in the main frame 20. A second embodiment will be described as an example of this configuration.

The video camera in the second embodiment has the same constitution as the video camera in the first embodiment, except for the constitution of the edges of the side panels 231 and 232 and the upper wall 201 of the main frame 20. Thus, those members having the same function will be numbered the same and not described again.

Figure 9:
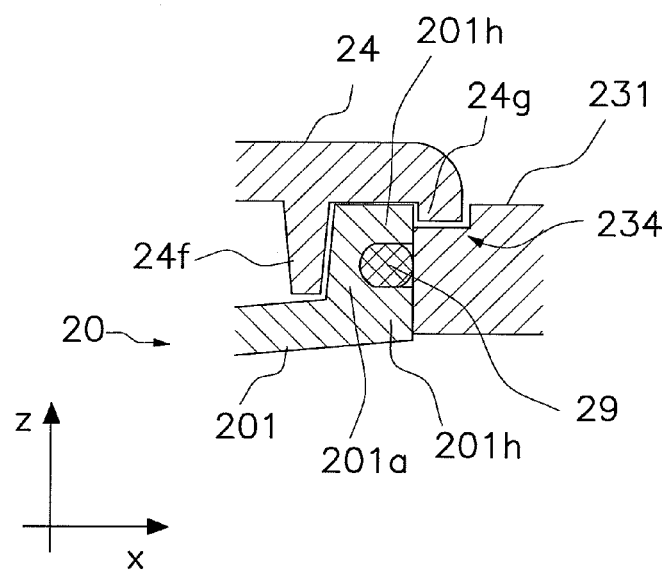
FIG. 9 is a cross section of the joined portions between the side panels 231 and 232, the top cover 24, and the main frame 20 in the second embodiment.

FIG. 9 is a cross section of the joined portions between the side panels 231 and 232, the top cover 24, and the main frame 20 in the second embodiment.

As shown in FIG. 9, in this embodiment the main frame 20 includes two projections 201h that stick out in the x axis direction at the joined portions between the projections 201a and the side panels 231 and 232. The projections 201h are aligned parallel to each other in the z axis direction, and are formed continuously in the y axis direction along the edges of the side panels 231 and 232. The portion flanked by these two projections 201h serves as a groove, so the constitution of the main frame 20 in this embodiment can be said to be such that a groove is formed in the y axis direction by the side faces of the projections 201a.

The edges of the side panels 231 and 232 are flat, and the shield gasket 29 is supported by being sandwiched between the two projections 201h and the side panels 231 and 232.

(3) Third Embodiment

The side panels 231 and 232 and the projections 201a of the main frame 20 may also have shapes that mate with each other. A third embodiment will be described as an example of this configuration.

The video camera in the third embodiment has the same constitution as the video camera in the first embodiment, except for the constitution of the edges of the side panels 231 and 232 and the upper wall 201 of the main frame 20. Thus, those members having the same function will be numbered the same and not described again.

Figure 10:
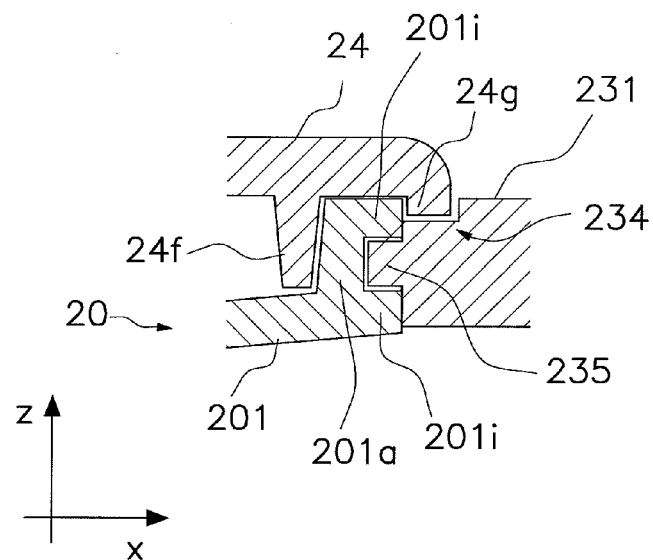
FIG. 10 is a cross section of the joined portions between the side panels 231 and 232, the top cover 24, and the main frame 20 in the third embodiment.

FIG. 10 is a cross section of the joined portions between the side panels 231 and 232, the top cover 24, and the main frame 20 in the third embodiment.

As shown in FIG. 10, this embodiment is the same as the second embodiment in that the main frame 20 includes two projections (projections 201i) that stick out in the x axis direction, at the joined portions between the projections 201a and the side panels 231 and 232. The projections 201i are aligned parallel to each other in the z axis direction, and are formed continuously in the y axis direction along the edges of the side panels 231 and 232. The portion flanked by these two projections 201i serves as a groove, so the constitution of the main frame 20 in this embodiment can be said to be such that a groove is formed in the y axis direction by the side faces of the projections 201a.

Projections 235 that stick out toward the upper wall 201 side are formed on the edges of the side panels 231 and 232, and these projections 235 are designed to fit in between the two projections 201i of the upper wall 201. In a state in which the projections 201i are in contact with the left side panel 231, a tiny gap is formed between the projection 235 and the projection 201a, and between the projection 235 and the projection 201i. Again with this structure, the minimum required sealing performance can be ensured. Also, with this structure it is less likely that there will be a shift in the relative positions of the main frame 20 and the side panels 231 and 232.

(4) Fourth Embodiment

The form in which the projections 201a of the main frame 20 and the side panels 231 and 232 fit together may be reversed from that in the third embodiment, so that the edges of the main frame 20 fit into the side panels 231 and 232. A fourth embodiment will be described as an example of this configuration.

The video camera in the fourth embodiment has the same constitution as the video camera in the first embodiment, except for the constitution of the edges of the side panels 231 and 232 and the upper wall 201 of the main frame 20. Thus, those members having the same function will be numbered the same and not described again.

Figure 11:
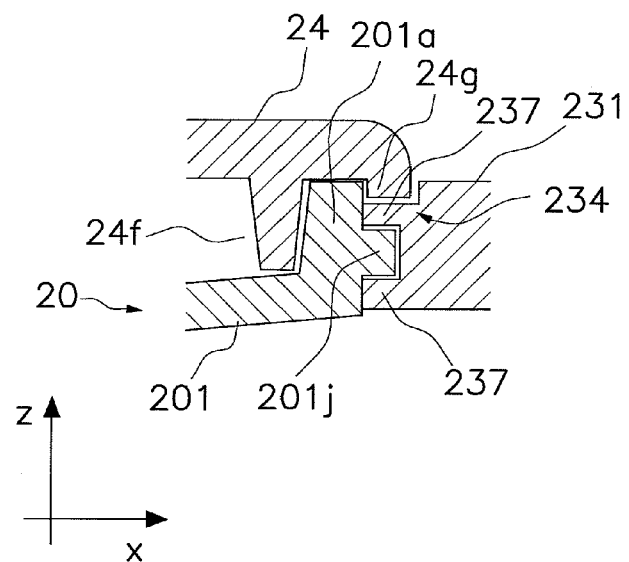
FIG. 11 is a cross section of the joined portions between the side panels 231 and 232, the top cover 24, and the main frame 20 in the fourth embodiment.

FIG. 11 is a cross section of the joined portions between the side panels 231 and 232, the top cover 24, and the main frame 20 in the fourth embodiment.

As shown in FIG. 11, in this embodiment the main frame 20 includes projections (projections 201j) that stick out in the x axis direction at the joined portions between the projections 201a and the side panels 231 and 232. The projections 201j are formed continuously in the y axis direction along the edges of the side panels 231 and 232.

As shown in FIG. 11, two projections 237 that stick out toward the upper wall 201 side are formed on the edges of the side panels 231 and 232, just as in the first embodiment. The two projections 237 are formed parallel to each other in the z axis direction and so as to be continuous along the edges of the side panels 231 and 232. The portion flanked by these two projections 237 serves as a groove, so the constitution of the side panels 231 and 232 in this embodiment can be said to be such that a groove is formed in the y axis direction by the contact positions with the main frame 20.

The projections 201j of the main frame 20 are designed to fit in between the projections 237. In a state in which the projections 237 are in contact with the projections 201a, a tiny gap is formed between the projection 201j and the side panel 231, and between the projection 201j and the projection 237. Again with this structure, the minimum required sealing performance can be ensured. Also, with this structure it is less likely that there will be a shift in the relative positions of the main frame 20 and the side panels 231 and 232.

In all of the above embodiments, the main frame 20 has a shape that allows integral molding.

(5) Other Embodiments (5-1) In the first embodiment, the rear wall 203 and the front wall 204 are such that their inner faces 2032 and 2042, as examples of a third plate (or fourth plate), are disposed intersecting the inner face 2012 of the upper wall 201 and the inner face 2022 of the lower wall 202. In particular, the inner faces 2032 and 2042 are disposed substantially parallel to each other, and intersect the inner face 2012 of the upper wall 201 and the inner face 2022 of the lower wall 202 at a right angle. Note that the constitution of the main frame 20 is not limited to this.

Specifically, in the first embodiment the four walls were molded integrally, but three or more walls may be molded integrally. That is, there may be at least opposing first and second walls, and a third wall disposed in between these two walls.

Also, the intersection angle of the walls need not be perpendicular, and can be varied as needed, with two opposing walls disposed at positions that are shifted from being parallel.

Also, with the first embodiment a closed rectangle was formed by the four walls 201 to 204, but as another mode in which there are four walls, there may be a discontinuous place between any two walls, or within any one wall.

(5-2) The projections 201a are formed in a long, continuous shape in the planar direction of the outer face 2011 of the upper wall 201 (the first plate), as an example of projections provided to the first plate, but the present invention is not limited to this.

For instance, projections with a short length in the y axis direction may be provided to the outer face 2011 instead of the projections 201a, and a plurality of these projections may be disposed so as to be aligned in the y axis direction.

Also, projections with a short length in the y axis direction may be provided in place of the projections 201h, 201i, and 201j, and a plurality of these projections may be disposed so as to be aligned in the y axis direction.

Also, the projections 201a can be used for supporting the shield gasket or for fitting with the side panels as in the first to fourth embodiments, but the projections provided to the first plate may be used for other purposes as well, such as positioning the panel members with respect to the first plate.

(5-3) The side panels 231 and 232 are an example of first and second panel members having a plane that includes a region surrounded by first to third walls, in which their shapes cover the left and right sides of the main frame 20, respectively. In particular, the side panels 231 and 232 are designed to touch the upper wall 201 of the main frame 20 at their edge portions.

However, the constitution of the main frame 20 is not limited to this, and instead of these side panels 231 and 232, first and second side panels may be employed which touch the main frame 20 more toward the centers of the panels than their edges in an assembled state. An example of such panel members are the projections 233, 235, and 237 shown in FIGS. 8, 10, and 11, which are provided to places other than the edges of the panels.

Similarly, with the projections 233, 235, and 237 of the side panels 231 and 232, they may be projections with a shorter length in the y axis direction, just as with the projections 201a, and a plurality of these projections may be disposed aligned in the y axis direction.

(5-4) A mode in which the alternatives described in each embodiment are suitably combined, and a mode in which different embodiments are suitably combined are also encompassed by the technological scope of the present invention.

(5-5) With the imaging device housings described above, manufacturing cost can be reduced while still ensuring adequate strength.

(6) Comparative Modes

Figure 12:
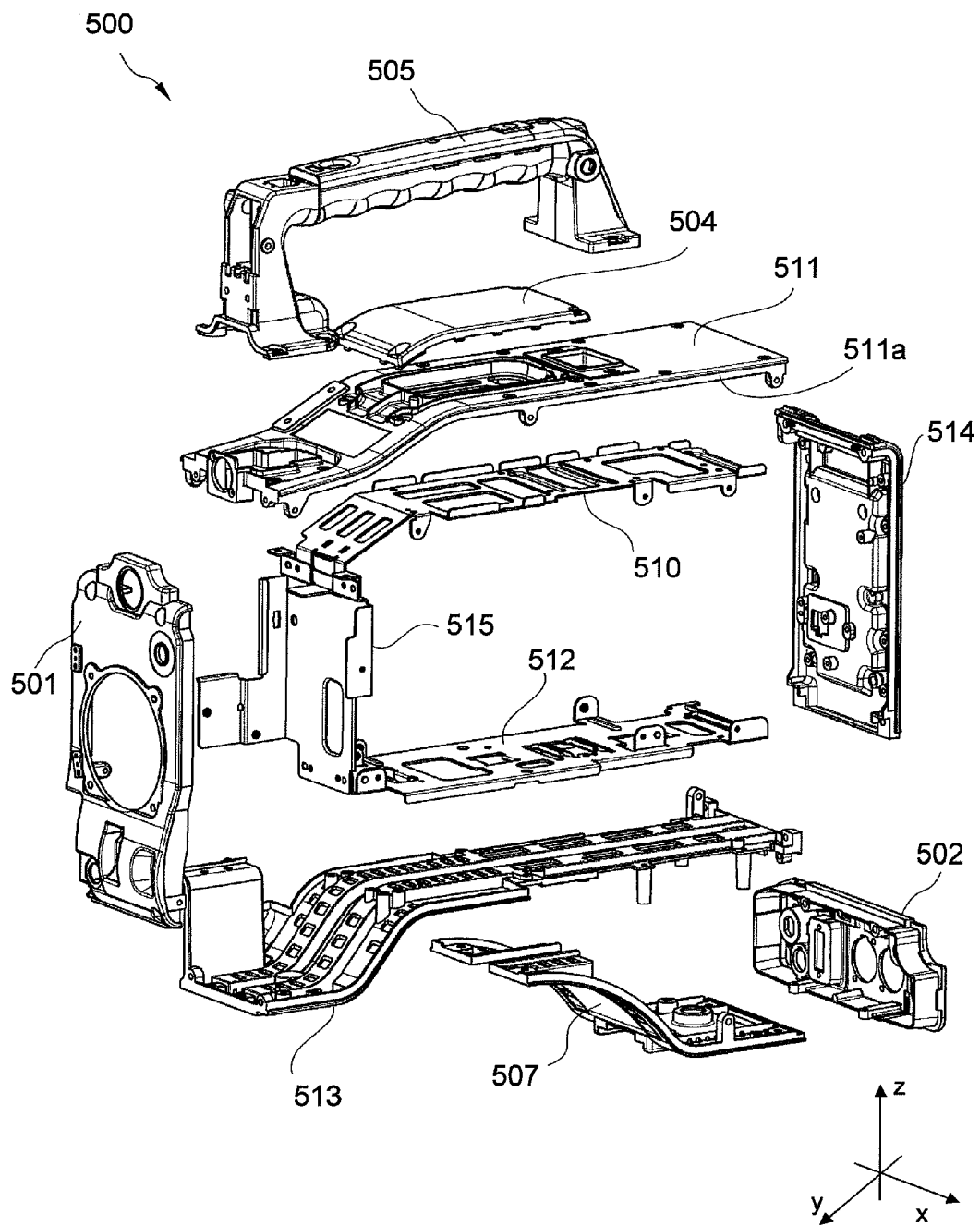
FIG. 12 is an exploded oblique view of the main body 500 in a comparative mode.

A video camera main body 500 pertaining to a comparative mode will be described through reference to FIGS. 12 and 13. FIG. 12 is an exploded oblique view of the main body 500, and FIG. 13 is a cross section of part of the main body 500 in a section parallel to the z-x plane.

Figure 13:
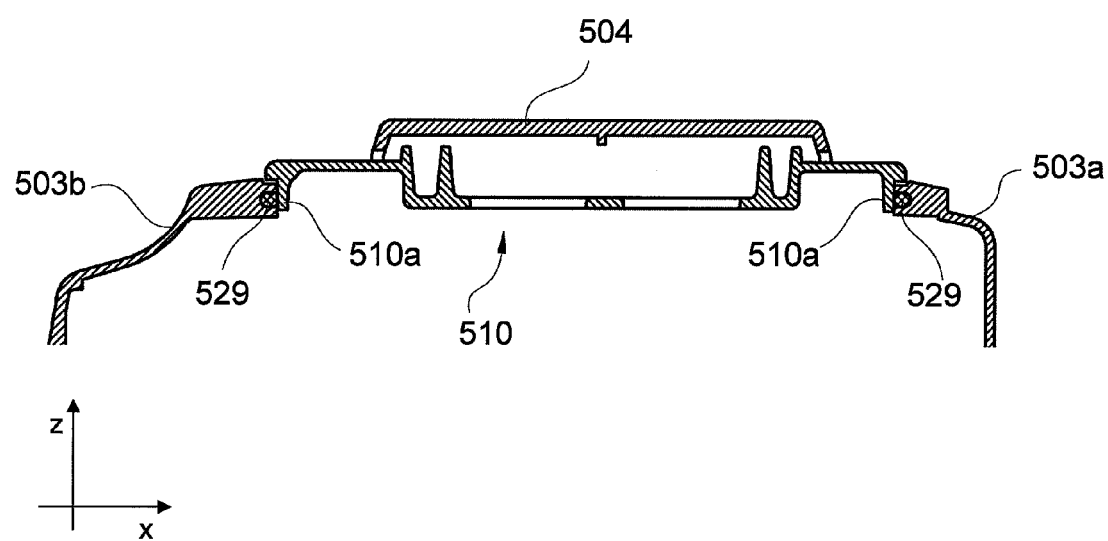
FIG. 13 is a cross section of part of the main body 500.

As shown in FIGS. 12 and 13, the main body 500 includes a front panel 501, a jack panel 502, side panels 503a and 503b, a top cover 504, a handle unit 505, and a bottom panel 507, and further includes a top panel 510, a top frame 511, a bottom frame 512, a bottom case 513, a back panel 514, and a front frame 515. The top panel 510, the top frame 511, the bottom frame 512, the bottom case 513, the back panel 514, and the front frame 515 are made of metal, and are individually formed and assembled. Side panels 531 and 532 are not depicted in FIG. 12.

As shown in FIGS. 12 and 13, the top panel 510 includes projections 510a that stick out downward and are provided near the edges of the lower face in the x axis direction. A shield gasket 529 is supported sandwiched between these projections 510a and the side panels 503a and 503b.

Thus, the top panel 510 includes two projections 510a that are aligned in the x axis direction on the lower face. Consequently, it is difficult for the top panel 510 to be molded integrally with other members.

In contrast, the above-mentioned main frame 20 is integrally molded, so there are fewer parts and the manufacturing cost can be reduced.

Also, since the top cover 504 is rectangular, the surface area of the part of the upper face of the top panel 511 that is not covered by the top cover 504 is larger than in the embodiments given above.

In contrast, with the above-mentioned top cover 24, the surface area covering the main frame 20 can be increased, which simplifies the painting step.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A video camera comprising:
an imaging device housing;
a lens; and
a view finder,
wherein the imaging device housing includes:
(i) a first plate;
(ii) a second plate spaced apart from the first plate and including a second plate main body, the second plate main body having a first side facing the first plate and a second side on an opposite side of the first side in a height direction of the imaging device housing, and the second plate main body having a first end and a second end spaced apart in a width direction of the imaging device housing perpendicular to the height direction;
(iii) a third plate formed integrally with the first plate and the second plate, and linking the first plate to the second plate;
(iv) a first protrusion disposed at the first end of the second plate main body and extending along the first end and protruding from the second side of the second plate main body in a direction away from the first plate;
(v) a cover member disposed on the second side of the second plate main body and having a projection and a first stepped portion, the projection extending at one end of the cover member along the first protrusion and projecting toward the second side of the second plate main body, the first stepped portion being recessed from the projection and mating with the first protrusion; and
(vi) a first panel member disposed to one side of the first plate and the second plate which is perpendicular to the second side of the second plate main body, the first panel member having a second stepped portion extending along the first protrusion, the second stepped portion being recessed and mating with the projection of the cover member.

2. The video camera of claim 1, further comprising:
a seal member held by the first protrusion and the first panel member.

3. The video camera of claim 2, wherein the first panel member comprises at least one projection protruding toward the first protrusion and touching the first protrusion.

4. The video camera of claim 1, wherein the first panel member includes at least one lateral projection protruding toward the one side of the first plate and the second plate and contacting the first protrusion.

5. The video camera of claim 4, wherein the lateral projection has a shape that extends along the second plate.

6. The video camera of claim 1, wherein the imaging device housing further comprises a fourth plate formed integrally with the first plate, the second plate, and the third plate,
wherein the fourth plate is disposed opposite to the third plate and links the first plate to the second plate.

7. The video camera of claim 1, further comprising a second protrusion disposed at the second end of the second plate main body and extending along the second end and protruding from the second side in the direction away from the first plate, the second end being disposed on an opposite end of the second plate from the first end.

8. The video camera of claim 7, wherein the imaging device housing further comprises a second panel member disposed to a side of the first plate and the second plate opposite to the first panel member, the first plate contacting the second protrusion.

9. The video camera of claim 7, wherein the first side of the second plate main body has no protrusion protruding in a direction toward the first plate at the first and second ends.

10. The video camera of claim 1, wherein the first panel member and the cover member are substantially perpendicular to each other.

11. The video camera of claim 1, wherein the third plate extends between the first plate and the second plate in the height direction of the imaging device housing, and
wherein the first panel member is disposed to the one side of the first plate and the second plate in the width direction of the imaging device housing.

12. The video camera of claim 11, wherein the imaging device housing further comprises a fourth plate formed integrally with the first plate, the second plate, and the third plate, the fourth plate linking the first plate to the second plate, and
wherein the fourth plate is disposed opposite to the third plate in a length direction of the imaging device housing, the length direction being perpendicular to the height direction and the width direction.

13. The video camera of claim 12, further comprising a seal member which is entirely enclosed between the first protrusion and the first panel member.

14. The video camera of claim 13, wherein the projection of the cover member which mates with the second stepped portion of the first panel member is a first projection, and the cover member further comprises a second projection on an opposite side of the first stepped portion from the first projection, and wherein the first protrusion mates with the first stepped portion and is disposed between the first projection and the second projection of the cover member.

15. The video camera of claim 1, further comprising a seal member which is entirely enclosed between the first protrusion and the first panel member.

16. The video camera of claim 1, wherein the projection of the cover member which mates with the second stepped portion of the first panel member is a first projection, and the cover member further comprises a second projection on an opposite side of the first stepped portion from the first projection, and wherein the first protrusion mates with the first stepped portion and is disposed between the first projection and the second projection of the cover member.

17. The video camera of claim 16, further comprising a seal member which is entirely enclosed between the first protrusion and the first panel member.

* * * * *